United States Patent
Wakasa

(10) Patent No.: US 10,377,132 B2
(45) Date of Patent: Aug. 13, 2019

(54) PRINTER, CONTROL METHOD OF A PRINTER, CONTROL DEVICE, AND MAINTENANCE SYSTEM

(71) Applicant: SEIKO EPSON CORPORATION, Tokyo (JP)

(72) Inventor: Shunichi Wakasa, Chikuma (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/612,624

(22) Filed: Jun. 2, 2017

(65) Prior Publication Data
US 2017/0348970 A1   Dec. 7, 2017

(30) Foreign Application Priority Data

Jun. 3, 2016   (JP) .................................. 2016-112079

(51) Int. Cl.
*B41J 2/045* (2006.01)
*B41J 2/165* (2006.01)
(Continued)

(52) U.S. Cl.
CPC ....... *B41J 2/04573* (2013.01); *B41J 2/04586* (2013.01); *B41J 2/165* (2013.01);
(Continued)

(58) Field of Classification Search
CPC .... B41J 2/04573; B41J 2/04586; B41J 2/165; B41J 2/17503; B41J 2/16523;
(Continued)

(56) References Cited

U.S. PATENT DOCUMENTS

2004/0190967 A1* 9/2004 Mizuno ................. G06F 3/1213
400/76
2005/0027486 A1* 2/2005 Kitada .................. G06F 3/1207
702/185
(Continued)

FOREIGN PATENT DOCUMENTS

EP    2 151 749 A2    2/2010
JP    2004-130517 A   4/2004
(Continued)

OTHER PUBLICATIONS

Translation of JP 2005-332279 A. (JP 2005-332279 A was published on Dec. 2, 2005.) (Year: 2005).*
(Continued)

*Primary Examiner* — Justin Seo
(74) *Attorney, Agent, or Firm* — Foley & Lardner LLP

(57) ABSTRACT

A printing device is configured to be used simultaneously with other printing devices and includes: a print unit configured to print by ejecting ink from nozzles; a timekeeping unit configured to keep time; a storage configured to store a reference period for executing a nozzle maintenance operation, the reference period being initially set at an initial reference period; and a maintenance processor configured to: execute a nozzle maintenance operation each time the reference period passes based on the time kept by the timekeeping unit, change the reference period stored in the storage from the initial reference period to a changed reference period such that a timing of the nozzle maintenance operation differs from a timing of the nozzle maintenance operation of at least one of the other printing devices, and execute the nozzle maintenance operation after the changed reference period passes.

6 Claims, 11 Drawing Sheets

(51) Int. Cl.
*B41J 2/175* (2006.01)
*G06F 3/12* (2006.01)

(52) U.S. Cl.
CPC ....... *B41J 2/16517* (2013.01); *B41J 2/16523* (2013.01); *B41J 2/17503* (2013.01); *G06F 3/1203* (2013.01); *G06F 3/1229* (2013.01); *G06F 3/1285* (2013.01); *B41J 2002/16573* (2013.01)

(58) Field of Classification Search
CPC ......... B41J 2/16517; B41J 2002/16573; G06F 3/1291; G06F 3/1229; G06F 3/1211
See application file for complete search history.

(56) References Cited

U.S. PATENT DOCUMENTS

| | | |
|---|---|---|
| 2007/0229583 A1 | 10/2007 | Otsuka |
| 2010/0123753 A1 | 5/2010 | Murahashi |
| 2013/0107313 A1* | 5/2013 | Kirby .................... G06F 3/1203 358/1.15 |
| 2015/0153808 A1* | 6/2015 | Nakai ................... G06F 1/3209 358/1.14 |
| 2016/0121635 A1 | 5/2016 | Takata |

FOREIGN PATENT DOCUMENTS

| | | |
|---|---|---|
| JP | 2005-332279 A | 12/2005 |
| JP | 2006-095819 A | 4/2006 |
| JP | 2007-290357 A | 11/2007 |
| JP | 2009-083187 A | 4/2009 |
| JP | 2010-120248 A | 6/2010 |
| JP | 2013-103464 A | 5/2013 |
| JP | 2013-132860 A | 7/2013 |

OTHER PUBLICATIONS

Partial European Search Report dated Oct. 30, 2017 in related EP Appl. 17172384.4 (18 pgs.).

Extended European Search Report dated Feb. 5, 2018 in related European Appl. No. 17172384.4 (17 pgs.).

* cited by examiner

PRINTER, CONTROL METHOD OF A PRINTER, CONTROL DEVICE, AND MAINTENANCE SYSTEM

CROSS-REFERENCES TO RELATED APPLICATIONS

This application claims priority under 35 U.S.C. § 119 to Japanese Patent Application No. 2016-112079, filed on Jun. 3, 2016, the entire disclosure of which is hereby incorporated by reference herein.

BACKGROUND

The present disclosure relates to a printer, control method of a printer, control device, and maintenance system.

Printers that print by ejecting ink from nozzles and perform maintenance on the nozzles are known from the literature. See for example, JP-A-2013-132860. JP-A-2013-132860 describes a printer for which the user is tasked with specifying when (i.e., at what time) to execute the nozzle maintenance operation. The printer then executes the nozzle maintenance operation when the time specified by the user arrives.

However, multiple printers are commonly used in retail stores and other types of businesses. If all of the printers execute the nozzle maintenance operation at a regular interval, multiple printers may execute the nozzle maintenance operation at the same time. This means that when the nozzle maintenance operation is running, all of the multiple installed printers may simultaneously become unable to print while the maintenance operation executes.

SUMMARY

One objective of certain embodiments described below is to control the timing for nozzle maintenance so that the timing of the nozzle maintenance operation of one printer differs from the timing of the nozzle maintenance operation of other printers.

A printing device according to one embodiment is a printing device used simultaneously with other printing devices, and including: a print unit that prints by ejecting ink from nozzles; a timekeeping unit that keeps time; storage that stores a reference period as a reference for executing nozzle maintenance; and a maintenance processor that, based on the time kept by the timekeeping unit, executes a nozzle maintenance operation each time the reference period passes, and changes the reference period stored in the storage as the reference so that the timing of the nozzle maintenance operation differs from the timing of the nozzle maintenance operation of at least one of the other printing devices, and executes the nozzle maintenance operation after the changed reference period passes.

Because the printing device executes a nozzle maintenance operation each time the changed (updated) reference period passes, the timing of nozzle maintenance by the one printing device differs from the timing of nozzle maintenance by other printers.

In a printing device according to one aspect, the maintenance processor executes the nozzle maintenance operation after the changed reference period passes, and returns the changed reference period stored by the storage to the reference period used as the reference.

Because the nozzle maintenance operation executes after the changed reference period passes, and the reference period is then reset to the default reference period, the timing of nozzle maintenance continues to differ from the timing of nozzle maintenance by other printers.

In a printing device according to another aspect, the maintenance processor, based on a unique identifier assigned to the printing device, changes the reference period stored as a reference in the storage.

This aspect changes the reference period based on identification information (an identifier), and, based on the identifier, can therefore set the timing for nozzle maintenance to differ from the nozzle maintenance timing of other printing devices.

In a printing device according to another aspect, the identifier is a serial number.

Based on the serial number, this aspect can set the timing for nozzle maintenance to differ from the nozzle maintenance timing of other printing devices.

In a printing device according to another aspect, the nozzle maintenance includes a cleaning operation of suctioning ink from the nozzle openings.

Maintenance including a cleaning operation is a maintenance operation that consumes a large amount of ink. Therefore, by changing the timing for nozzle maintenance to differ from the nozzle maintenance timing of other printers, all printers running out of ink at the same time can be inhibited.

According to another embodiment, a printing control method is used simultaneously with a plurality of printing devices, each of which includes a print unit that prints by ejecting ink from nozzles, a timekeeping unit that keeps time, storage that stores a reference period as a reference for executing nozzle maintenance, and a maintenance processor that, based on the time kept by the timekeeping unit, executes a nozzle maintenance operation each time the reference period passes. The control method includes: changing the reference period stored in the storage of a first printing device as the reference so that the timing of the nozzle maintenance operation differs from the timing of the nozzle maintenance operation of at least one other printing device; and executing the nozzle maintenance operation after the changed reference period passes.

Because the printing device executes a nozzle maintenance operation each time the changed (updated) reference period passes, the timing of nozzle maintenance by the first printing device differs from the timing of nozzle maintenance by other printing devices.

According to another embodiment, a control device is capable of connecting to multiple printing devices that execute nozzle maintenance each time a reference period used as a reference passes. The control device includes: a controller that changes the reference period at which the maintenance is performed by at least some of the multiple printing devices so that all of the multiple printing devices do not execute the maintenance operation at the same time.

Because at least some of the multiple printing devices change the reference period, the timing of nozzle maintenance by the printing devices that changed the reference period can be made to differ from the timing of nozzle maintenance by the other printing devices.

According to another embodiment, a maintenance system includes multiple printing devices and a control device capable of communicating with the multiple printing devices. The printing devices execute a nozzle maintenance operation each time a reference period passes; and the control device changes the reference period at which the maintenance is performed by at least some of the multiple printing devices so that all of the multiple printing devices do not execute the maintenance operation at the same time.

Because at least some of the multiple printing devices change the reference period, the timing of nozzle maintenance by the printing devices that changed the reference period can be made to differ from the timing of nozzle maintenance by the other printing devices.

According to another embodiment, a printing device is used simultaneously with other printing devices, and includes: a print unit that prints by ejecting ink from nozzles; a timekeeping unit that keeps time; storage that stores a reference period as a reference for executing nozzle maintenance; and a maintenance processor that, when the reference period is stored in the storage, executes a nozzle maintenance operation each time the reference period passes based on the time kept by the timekeeping unit, and when the ink cartridge that was first installed is replaced, executes the nozzle maintenance operation and stores the reference period in the storage.

Because the printing device executes the nozzle maintenance operation and stores the reference period in the storage when the ink cartridge that was first installed is replaced, the printing device can continue to maintain a difference between the timing of nozzle maintenance and the timing of nozzle maintenance by other printing devices.

Other aspects and embodiments will become apparent by referring to the following description and claims taken in conjunction with the accompanying drawings.

DESCRIPTION OF EMBODIMENTS

Embodiment 1

Figure 1:
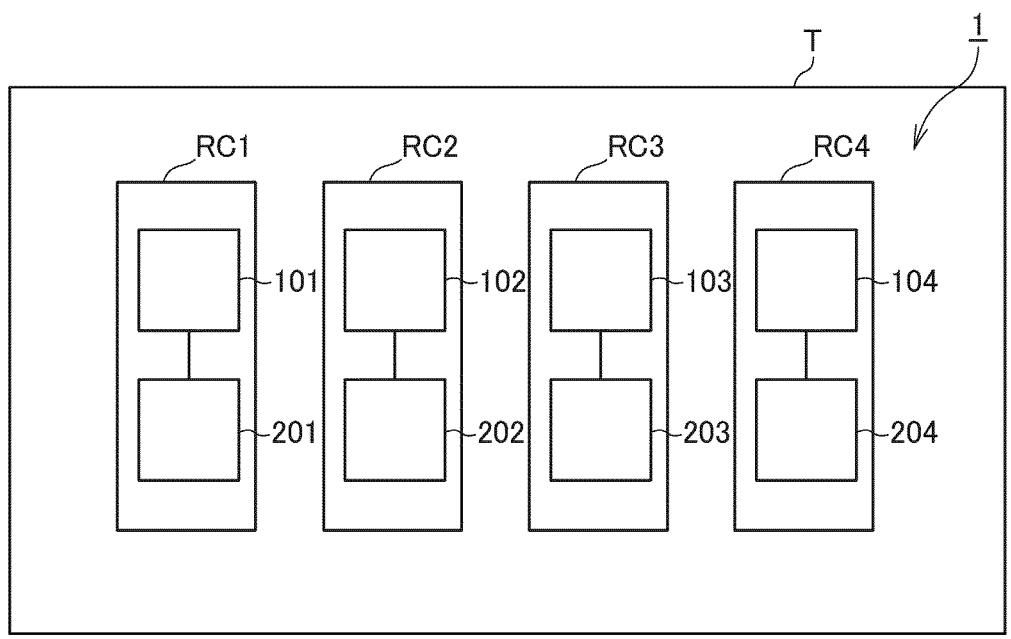
FIG. 1 is a block diagram illustrating a store system related to a first embodiment.

An embodiment of a store system 1 according to a first embodiment is described below with reference to the accompanying figures.

The store system 1 is a system used in retail stores such as supermarkets, convenience stores, department stores, restaurants, and other food service businesses. The store system 1 produces coupons, receipts, and other printouts for customers that complete transactions at the store or business.

Multiple checkout counters are located in a store T. In the example shown in FIG. 1, store T has four checkout counters, checkout counter RC1 to checkout counter RC4.

Installed at each checkout counter are a printer (printing device) and a host computer that connects to the printer. In the example in FIG. 1, installed at checkout counter RC1 are printer 101 and host computer 201. Installed at checkout counter RC2 are printer 102 and host computer 202. Installed at checkout counter RC3 are printer 103 and host computer 203. Installed at checkout counter RC4 are printer 104 and host computer 204. In other words, the store system 1 shown in FIG. 1 has four printers, printer 101 to printer 104, and four host computers, host computer 201 to host computer 204, that connect to the corresponding printers.

Below, when not distinguishing between printer 101 to printer 104, the printer is referred to generically as printer 100. When not distinguishing between host computer 201 to host computer 204, the host computer is referred to generically as host computer 200.

The checkout counter is where customer transactions are processed. A checkout clerk responsible for a particular cash register is stationed at each checkout counter, and the host computer 200 controls the printer 100 as instructed by the checkout clerk to print coupons and receipts, for example. When a sales transaction is processed at checkout counter RC1, for example, the host computer 201 executes a payment process corresponding to the transaction, and sends control data instructing printing a receipt to the printer 101. The printer 101, based on the received control data, produces a receipt, coupon, or other printout. The printed coupon and receipt is then given to the customer.

Figure 2:
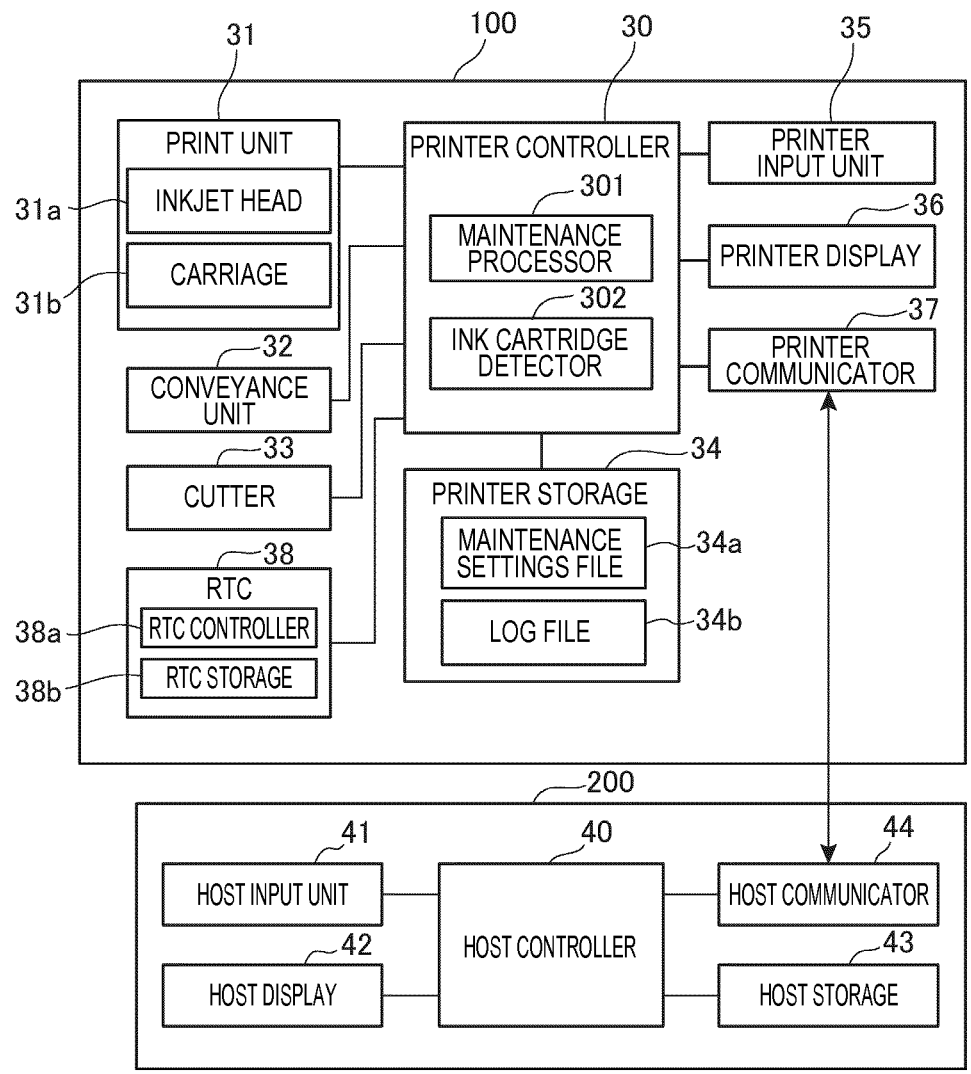
FIG. 2 is a block diagram illustrating the functional configuration of a printer and host.

FIG. 2 is a block diagram showing the functional configuration of the printer 100 and host computer 200.

As shown in FIG. 2, the printer 100 has a printer controller 30, print unit 31, conveyance unit 32, cutter 33, printer storage 34 (storage unit), printer input unit 35, printer display 36, and printer communicator 37.

The printer controller 30 includes a CPU, ROM, RAM, and other peripheral circuits not shown, and controls the printer 100 by the cooperation of hardware and software, such as the CPU reading and running a control program. By executing control programs stored in ROM or the printer storage 34, the printer controller 30 functions as the maintenance processor 301 and ink cartridge detector 302 described below.

The print unit 31 includes an inkjet head 31a, a drive circuit that drives the inkjet head 31a, a carriage 31b, a scanning motor that drives the carriage 31b bidirectionally, a motor driver that drives the scanning motor, and other mechanisms related to printing on roll paper (not shown in the figure), which is the print medium stored by the printer 100 in this example. The print unit 31 prints text and images, for example, on roll paper as controlled by the printer controller 30. The inkjet head 31a and carriage 31b of the print unit 31 are described below.

The conveyance unit 32 includes a conveyance roller (not shown in the figure) for conveying roll paper; a follower roller (not shown in the figure) that follows the conveyance roller; a conveyance motor that turns the conveyance roller; a motor driver that drives the conveyance motor; and other mechanisms related to conveying roll paper. The conveyance unit 32 conveys the roll paper as controlled by the printer controller 30.

The cutter 33 has a cutter unit (not shown in the figure) including a fixed knife (not shown in the figure) and a movable knife (not shown in the figure) that moves in relation to the fixed knife to cut roll paper; a cutter motor that causes the movable knife to move; a motor driver that drives the cutter motor; and other mechanisms related to cutting roll paper. The cutter 33 cuts the roll paper as controlled by the printer controller 30.

The printer storage 34 is a nonvolatile memory device such as an EEPROM device or hard disk drive, and rewritably stores data. The printer storage 34 stores a maintenance settings file 34a, and a log file 34b.

The maintenance settings file 34a stores maintenance items related to nozzle maintenance paired with the values (settings) corresponding to the specific maintenance item. Nozzle maintenance is described further below.

The maintenance items related to nozzle maintenance include at least the period (constant period) for starting the high-power cleaning operation described below (referred to below as the start high-power cleaning operation period); and the time to start the high-power cleaning operation (referred to below as the start high-power cleaning operation time).

Below, the maintenance items related to setting the start high-power cleaning operation period are referred to below as "start period setting item." The maintenance items related to setting the start high-power cleaning operation time are referred to below as "start time setting item." The value set for the start period setting item is a value indicating the day (date). The value set for the start time setting item is a value indicating the time.

Described in further detail below, the printer 100 executes a high-power cleaning operation based on the values set for the start period setting item and the start time setting item. More specifically, each time the start high-power cleaning operation period passes, the printer 100 executes the high-power cleaning operation at the start high-power cleaning operation time on the day the start high-power cleaning operation period passes. The start high-power cleaning operation period is therefore the period for starting the high-power cleaning operation at a constant interval, and is equivalent to a constant time at which the high-power cleaning operation executes. That the printer storage 34 stores a value for the start period setting item of the maintenance settings file 34a is equivalent to storing constant time information indicating a constant time for starting the high-power cleaning operation.

References below to making a setting in the maintenance settings file 34a means storing a value (setting) for a specific setting (configuration) item stored in the maintenance settings file 34a. For example, setting the start high-power cleaning operation period in the maintenance settings file 34a means setting (storing) the value for the start period setting item in the maintenance settings file 34a.

The log file 34b is a file chronologically recording specific operations of the printer 100, and specific events that occurred in the printer 100, as text data. Information such as described below is recorded in the log file 34b. More specifically, triggered by the high-power cleaning operation being executed, information indicating that the high-power cleaning operation was executed is recorded relationally to information indicating when the high-power cleaning operation was executed (year, month, day, and time) in the log file 34b.

The printer storage 34 also stores a unique identifier assigned to the printer 100 during production or shipping. An example of such an identifier is the serial number of the printer 100.

The printer storage 34 also stores information indicating a period of 400 days (a specific time used as a reference) as the default start high-power cleaning operation period.

The printer input unit 35 has input means such as operating switches or a touch panel disposed to the printer 100, detects operation of the input means, and outputs to the printer controller 30. Based on the input from the printer input unit 35, the printer controller 30 executes processes corresponding to the operation of the input means.

The printer display 36 includes multiple LEDs and a display panel, and as controlled by the printer controller 30 displays information about the status of the printer 100 and errors that may have occurred.

The printer communicator 37, as controlled by the printer controller 30, communicates according to a specific communication protocol with the host computer 200.

A RTC 38 (Real-Time Clock; timekeeping unit) outputs current time information (time information) indicating the current time (date, time) to the printer controller 30. The current time information in this example is information expressing the year, month, day, and time in a set format such as Year ABCD Month E Day F Hour 22 Minute 00 Second 00; YMD, HMS). Below, the information about the year, month, and day included in the current time information, that is, the information indicating Year ABCD Month E Day F, is referred to as the current-time date information. The time information, such as the information indicating Hour 22 Minute 00 Second 00, in the year, month, day, and time included in the current time information is referred to as the current-time time information.

As shown in FIG. 2, the RTC 38 has a RTC controller 38a and RTC storage 38b.

The RTC controller 38a comprises a CPU, ROM, RAM, and other peripheral circuits not shown, and controls the RTC 38. The RTC controller 38a is communicatively connected to the printer controller 30.

The RTC storage 38b is RAM in this example, and stores the current time information while power is supplied to the RTC 38.

The RTC storage 38b stores the current time information. The RTC controller 38a executes a timekeeping operation based on a reference clock generated by an oscillator not shown, and based on the current time information stored by the RTC storage 38b, updates the current time information according to the time that has passed. The RTC controller 38a also sends the current time information to the printer controller 30 when the current time stored by the RTC storage 38b is updated according to the passed time. Updating the current time information according to the passed time based on the current time information stored by the RTC storage 38b is equivalent to keeping time based on time information.

The maintenance processor 301 and ink cartridge detector 302 of the printer controller 30 are described next.

The maintenance processor 301 maintains the nozzles of the inkjet head 31a as described further below. Nozzle maintenance includes at least a high-power cleaning operation. Each time the start high-power cleaning operation period, indicated by the value set for the start period setting item in the maintenance settings file 34a, passes, the maintenance processor 301 executes the high-power cleaning operation at the start high-power cleaning operation time indicated by the value set for the start time setting item. For example, assume the start high-power cleaning operation period is 400 days, and the start high-power cleaning operation time is 22:00:00. The maintenance processor 301, starting from the date the high-power cleaning operation was last executed, or the date when the current time was set by the user, for example, when the printer 100 was first installed in the store T, determines if 400 days have passed since that start date based on the current time information output from the RTC 38.

The ink cartridge detector 302 also detects if an ink cartridge is installed in the printer 100. The ink cartridge detector 302 also determines if the ink cartridge installed in the printer 100 is the first ink cartridge that was installed. The first ink cartridge that was installed means the first ink cartridge that was installed in the printer 100 after the printer 100 was manufactured and shipped.

The host computer 200 is described next.

The host computer 200 includes a host controller 40, host input unit 41, host display 42, host storage 43, and host communicator 44.

The host controller 40 includes a CPU, ROM, RAM, and other peripheral circuits not shown, and controls the host computer 200 by the cooperation of hardware and software, such as a CPU reading and running a control program.

The host input unit 41 is connected to input means such as various input devices or operating switches, detects operation of the input means, and outputs to the host controller 40.

The host display 42 includes a display panel or other type of display device, and displays information on the display device as controlled by the host controller 40.

The host storage 43 is a nonvolatile memory device such as an EEPROM device or hard disk drive, and rewritably stores data.

The host communicator 44, as controlled by the host controller 40, communicates with the printer 100 according to a specific communication protocol.

As described above, the maintenance processor 301 of the printer 100 executes a high-power cleaning operation as an example of a nozzle maintenance operation. The high-power cleaning operation is described below through a description of the inkjet head 31a and carriage 31b.

Figure 3:
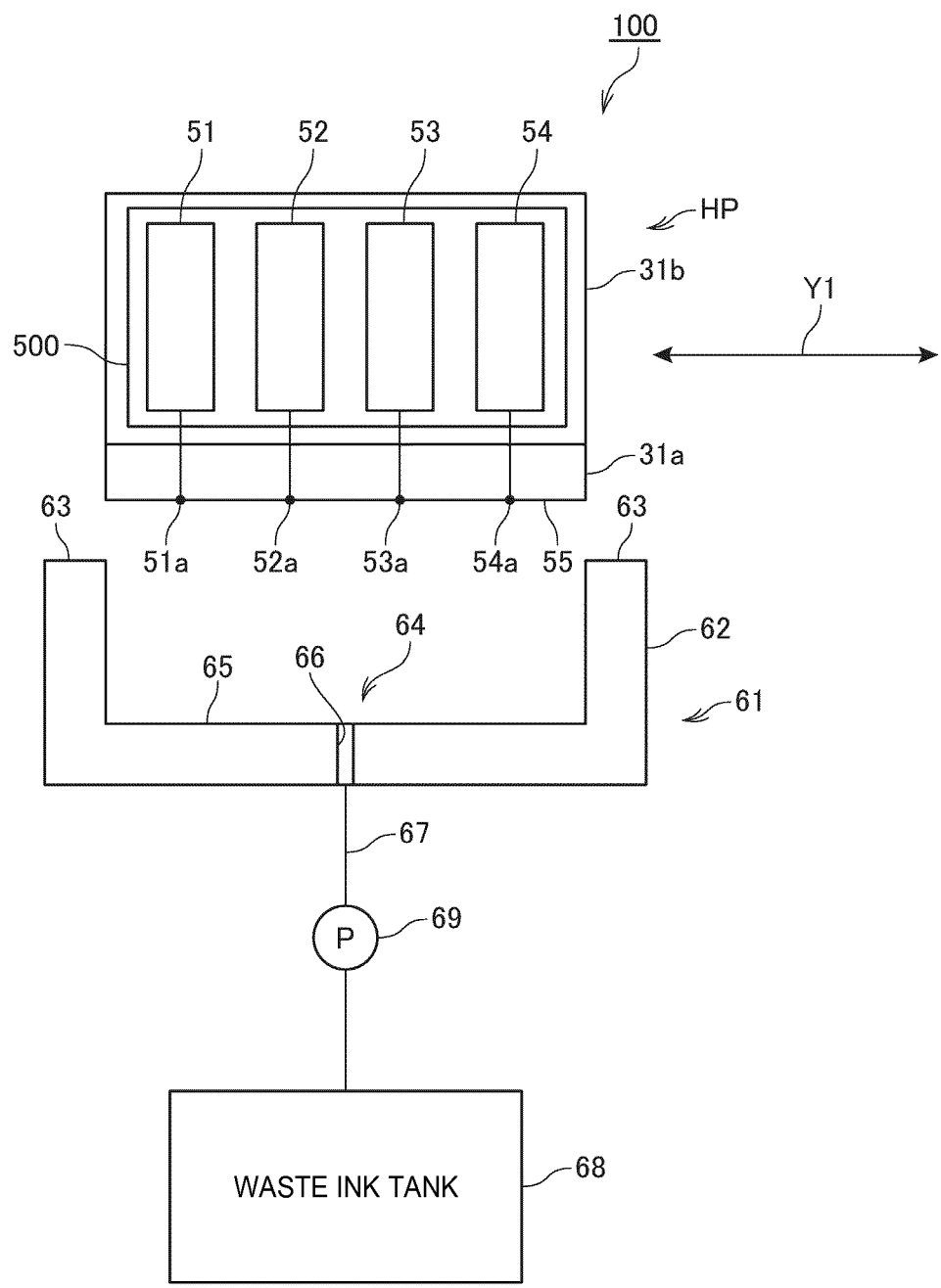
FIG. 3 schematically illustrates the configuration of the printer.

FIG. 3 schematically illustrates the configuration of the printer 100.

The high-power cleaning operation is described below with reference to FIG. 3.

As shown in FIG. 3, the printer 100 has a carriage 31b that scans bidirectionally in the main scanning direction Y1. An integrated ink cartridge 500 is installed to the carriage 31b. The integrated ink cartridge 500 includes a cyan ink tank 51 that stores cyan (C) ink; a black ink tank 52 that stores black (K) ink; a yellow ink tank 53 that stores yellow (Y) ink; a magenta ink tank 54 that stores magenta (M) ink.

The carriage 31b also carries an inkjet head 31a that ejects ink to the roll paper. Numerous nozzle openings through which ink is ejected as fine ink droplets are formed in the distal face of the inkjet head 31a. The inkjet head 31a, by means of an actuator configured with a piezoelectric device, pushes ink supplied from the ink tanks toward the roll paper, and selectively ejects fine ink droplets from the nozzle openings.

The nozzles are arrayed in four rows (lines) in the nozzle face 55, which is the bottom surface of the inkjet head 31a. Ink is supplied from different ink tanks to each of the four nozzle rows, and each nozzle row ejects a different color of ink. In the example in FIG. 3, a cyan nozzle row 51 ejects ink supplied from the cyan ink tank 51. A black nozzle row 52a ejects ink supplied from the black ink tank 52. A yellow nozzle row 53a ejects ink supplied from the yellow ink tank 53. A magenta nozzle row 54a ejects ink supplied from the magenta ink tank 54.

The printer 100 prints text and images on roll paper by alternately repeating the operation of conveying the roll paper in the conveyance direction by a conveyance mechanism not shown; and a printing operation of scanning the inkjet head 31a carried on the carriage 31b in the main scanning direction Y1 perpendicular to the conveyance direction while ejecting ink to the roll paper from the inkjet head 31a. During the printing operation, the printer 100 ejects a specific amount of ink from the nozzles of the different colors of ink in the inkjet head 31a while scanning the inkjet head 31a on the main scanning direction Y1, and forms dots rendering the text or images to be printed on the roll paper. The inkjet head 31a therefore moves in the main scanning direction Y1 during the printing operation of printing images on roll paper, but waits at the home position HP while in the standby mode. The standby mode is a mode of waiting to execute the printing operation. A capping device 61 is disposed directly below the inkjet head 31a when at the home position HP.

The capping device 61 has a box-like cap 62 that is open to the top. The cap 62 has a frame 63 configured with rubber or other type of elastic material. An inkjet head storage space 64 that holds the inkjet head 31a is formed in the space surrounded by the frame 63. The cap 62 can move vertically as driven by a dedicated motor that is driven as controlled by the printer controller 30. When the cap 62 rises, the cap 62 stores the nozzle face 55 of the inkjet head 31a set to the home position HP in the inkjet head storage space 64. More specifically, the inside circumference of the frame 63 of the cap 62 is substantially the same shape as the outside circumference of the inkjet head 31a. When the cap 62 rises to a specific position, the nozzle face 55 is housed inside the inkjet head storage space 64 with the outside circumference of the inkjet head 31a touching the inside of the frame 63.

A drain hole 66 passing through the bottom 65 is formed in the bottom 65 of the cap 62. A tube 67 is connected to the drain hole 66. A waste ink tank 68 for storing waste ink is connected to the tube 67. A pump 69 that suctions and discharges waste ink through the drain hole 66 is disposed to the tube 67.

The printer 100 uses the capping device 61 to execute the high-power cleaning operation. A flushing operation and normal cleaning operation are described here to help clearly describe the high-power cleaning operation. Note that the flushing operation and normal cleaning operation are included in the nozzle maintenance performed by the maintenance processor 301.

The flushing operation is an operation of discharging ink from the nozzles formed in the nozzle face 55 while the nozzle face 55 is positioned opposite the inkjet head storage space 64 but is not stored in the inkjet head storage space 64. Ink collected in the inkjet head storage space 64 is suctioned through the drain hole 66 from the ink pump.

Of the numerous nozzles formed in the nozzle face 55, ink ejection problems may result from, for example, ink increasing in viscosity in nozzles that are not used in the printing operation and nozzles that are used infrequently. The flushing operation is an operation that is executed to prevent such ejection problems, ejects a specific amount of ink from each of the nozzles in each nozzle row formed in the nozzle face 55, and replaces the ink in each nozzle with fresh ink.

To prevent ink left inside the nozzles (not shown in the figure) of the inkjet head 31a from increasing in viscosity over time, and those nozzles from being able to eject ink, the normal cleaning operation forcefully suctions and removes the ink left in the nozzles.

In the normal cleaning operation, the inkjet head 31a is moved to the home position HP, and the nozzle face 55 of the inkjet head 31a is stored in the inkjet head storage space 64 of the cap 62 by the cap 62 of the capping device 61 rising to a specific position. Next, the pump 69 is driven, air is thereby suctioned from the drain hole 66, negative pressure is applied to the nozzle face 55, and ink remaining in the nozzles is forcibly suctioned therefrom by the negative pressure.

The high-power cleaning operation is an operation that forcibly suctions ink from the nozzles for a longer period of time (such as 4 minutes) and with higher suction pressure than the normal cleaning operation. The amount of ink suctioned by the high-power cleaning operation is also greater than in the normal cleaning operation. In other words, the high-power cleaning operation consumes more ink from each ink tank of the ink cartridge 500 than the flushing operation and the normal cleaning operation.

The high-power cleaning operation is an operation that is executed after a longer interval of time than the flushing operation and normal cleaning operation. In other words, the high-power cleaning operation is an operation that is executed less frequently than the flushing operation and normal cleaning operation. Because executing the high-power cleaning operation passes a large amount of ink through the nozzles and uses high pressure, the high-power cleaning operation can eliminate ink clogs in the nozzles with high reliability.

However, because the high-power cleaning operation is a nozzle maintenance operation that consumes more ink than the flushing operation or normal cleaning operation as described above, there are some issues.

For example, assume that printer 101 to printer 104 in FIG. 1 were all installed in the store T on the same day, such as when a new store T opens. On the day printer 101 to printer 104 were installed in the store T, printer 101 to printer 104 were turned on and the user set the current time in each. The setting of the start period setting item in the maintenance settings file 34a of each printer 101 to printer 104 is 400 days, and the start time setting item is set to 22:00:00.

Once the current time is set on the date installed to the store T, each printer 101 to printer 104 starts counting (determining), based on output from the RTC 38, from the installation date as the starting date whether or not 400 days have passed since the installation date. When 400 days have passed since the installation date, printer 101 to printer 104 each executes the high-power cleaning operation at 22:00:00 on day 400 after the starting date. More specifically, printer 101 to printer 104 each execute the high-power cleaning operation at the same time (22:00:00 on day 400). Because the high-power cleaning operation is executed by each printer 101 to printer 104 at the same time, the printers 100 in the store T cannot print while the printers 101 to 104 are executing the high-power cleaning operation. As a result, the store system 1 cannot print receipts or coupons for customers making transactions during this time.

Other issues occur even if the time when the high-power cleaning operation is executed is set to a time after normal business hours. As described above, the high-power cleaning operation is a nozzle maintenance task that consumes more ink than the flushing operation or normal cleaning operation. The probability of a printer 101 to printer 104 running out of ink as a result of the high-power cleaning operation is therefore high.

For example, let 22:00:00 be outside normal business hours of the store T. If each printer 101 to printer 104 executes the high-power cleaning operation at the same 22:00:00, every printer 101 to printer 104 in the store T may be out of ink when the store T next opens for business. In this event, ink must be added to every printer 101 to printer 104 in the store T when the store T next opens. The store T must therefore maintain a supply of ink cartridges 500 in anticipation of needing to replace the ink cartridge 500 in every printer 101 to printer 104 at the same time.

The printer 100 therefore sets the start high-power cleaning operation period in the maintenance settings file 34a based on a first rule (specific rule) or a second rule (specific rule) that is different from the first rule.

First Rule

Operation of the printer 100 according to the first rule when setting the start high-power cleaning operation period in the maintenance settings file 34a is described first.

Figure 4:
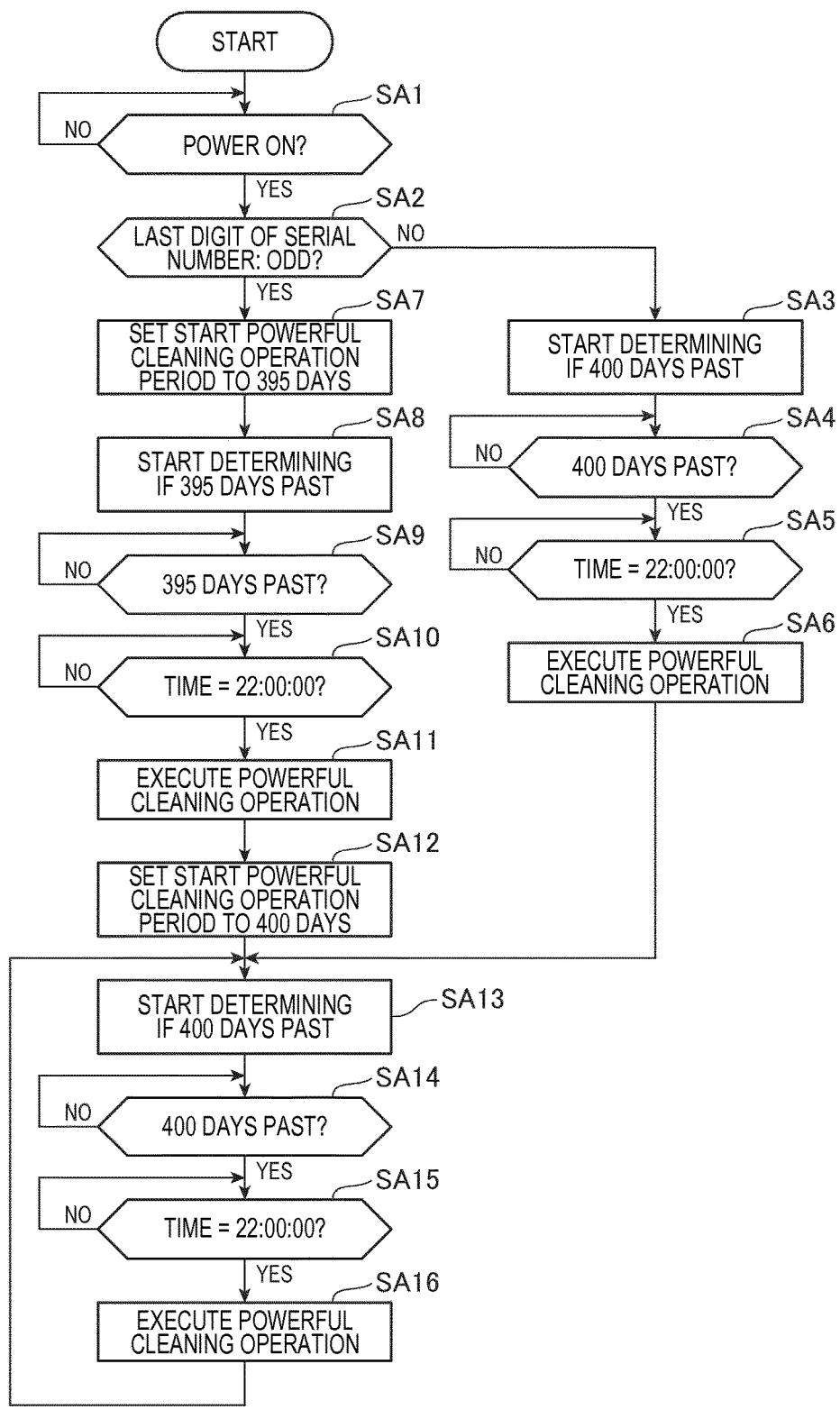
FIG. 4 is a flow chart describing an operation of the printer.

FIG. 4 is a flow chart of printer 100 operation.

When the process shown in the flow chart in FIG. 4 starts, a start high-power cleaning operation period setting of 400 days is already stored in the maintenance settings file 34a. A start high-power cleaning operation time setting of 22:00:00 is also already set in the maintenance settings file 34a.

When a printer 100 is installed in the store T and the power turned on, the printer controller 30 of the printer 100 recognizes the power turned on (step SA1: YES), and determines if the last digit in the serial number stored in the printer storage 34 is an odd number (step SA2). More specifically, in step SA2, the printer controller 30 determines wither the last digit in the serial number is odd or even.

If the last digit in the serial number is not odd (step SA2: NO), that is, the last digit in the serial number is an even number, the maintenance processor 301 of the printer 100, based on the date indicated by the current-time date information output from the RTC 38, starts determining whether or not the start high-power cleaning operation period has passed (step SA3).

As described above, the start period setting item is set by default to 400 days. The maintenance processor 301 therefore starts determining whether or not 400 days have passed from the starting date, which is the date the power first turned on and the user set the current time. Note that even if the power supply is turned off or interrupted, power continues to be supplied to the RTC 38 from a battery, for example. As a result, when the power supply resumes, the maintenance processor 301 can continue determining if 400 days have passed since the starting date.

If 400 days have passed (step SA4: YES), more specifically, if the date indicated by the current-time date information is day 400 after the starting date, the maintenance processor 301 determines if the time indicated by the current-time time information is 22:00:00 (step SA5).

Next, if the time indicated by the current-time time information is 22:00:00 (step SA5: YES), the maintenance processor 301 executes the high-power cleaning operation (step SA6).

Next, the maintenance processor 301, based on the current time information output from the RTC 38, starts determining if the start high-power cleaning operation period has passed (step SA13). In this step, the maintenance processor 301 starts determining whether or not the start high-power cleaning operation period has passed based on the date and time recorded in the log file 34b as the date and time the high-power cleaning operation was executed. As described above, the date and time the high-power cleaning operation is executed is recorded in the log file 34b. The maintenance processor 301 starts determining if 400 days passed since the starting date, which is the date included in the date and time information recorded in the log file 34b.

Next, if 400 days have passed since the starting date, (step SA14: YES), the maintenance processor 301 determines if the time indicated by the current-time time information is 22:00:00 (step SA15).

Next, if the time indicated by the current-time time information is 22:00:00, (step SA15: YES), the maintenance processor 301 executes the high-power cleaning operation (step SA16). After executing the high-power cleaning operation, the maintenance processor 301 returns to step SA13 and repeats step SA13 to step SA16.

Returning to step SA2, if the last digit in the serial number is odd (step SA2: YES), the maintenance processor 301 of the printer 100, sets the start high-power cleaning operation period to 395 days in the maintenance settings file 34a (step SA7). More specifically, the maintenance processor 301 sets the value recorded for the start period setting item in the maintenance settings file 34a to a value indicating 395 days. In other words, the maintenance processor 301 changes the start high-power cleaning operation period from 400 days to 395 days.

Next, the maintenance processor 301, based on the current time output from the RTC 38, starts determining if the start high-power cleaning operation period has passed (step SA8). More specifically, the maintenance processor 301 starts determining whether or not 395 days have passed from the starting date, which is the date the power first turned on and the user set the current time.

If 395 days have passed (step SA9: YES), more specifically, if the date indicated by the current-time date information is day 400 after the starting date, the maintenance processor 301 determines if the time indicated by the current-time time information is 22:00:00 (step SA10).

Next, if the maintenance processor 301 determines in step SA10 that the time indicated by the current-time time information is 22:00:00 (step SA10: YES), the maintenance processor 301 executes the high-power cleaning operation (step SA11).

As described above, by the first rule, the start high-power cleaning operation period being set in the maintenance settings file 34a means that, when the serial number uniquely assigned to each printer 100 is an odd number, a start high-power cleaning operation period (395 days) that is different from the previously set (default) start high-power cleaning operation period (400 days) is set in the maintenance settings file 34a. The effect of this is described further below.

When the maintenance processor 301 executes the high-power cleaning operation in step SA11, it sets a start high-power cleaning operation period of 400 days in the maintenance settings file 34a (step SA12). More specifically, the maintenance processor 301 changes the start high-power cleaning operation period set in the maintenance settings file 34a from 395 days to 400 days, thereby resetting the start high-power cleaning operation period to the previously set 400 days.

Next, based on the current time information output from the RTC 38, the maintenance processor 301 starts determining if the start high-power cleaning operation period has passed (step SA13). In this step, the maintenance processor 301 starts determining whether or not the start high-power cleaning operation period has passed based on the date and time recorded in the log file 34b as the date and time the high-power cleaning operation was executed. The maintenance processor 301 starts determining if 400 days passed since the starting date, which is the date included in the date and time information recorded in the log file 34b.

Next, if 400 days have passed since the starting date, (step SA14: YES), and more specifically, if the date indicated by the current-time date information indicates day 400 since the starting date, the maintenance processor 301 determines if the time indicated by the current-time time information is 22:00:00 (step SA15).

Next, if the time indicated by the current-time time information is 22:00:00, (step SA15: YES), the maintenance processor 301 executes the high-power cleaning operation (step SA16). After executing the high-power cleaning operation, the maintenance processor 301 returns to step SA13 and repeats step SA13 to step SA16.

The operation described above is executed by each printer 101 to printer 104 in the store system 1.

What happens when each printer 101 to printer 104 in the store system 1 executes the above operation is described next.

Figure 5:
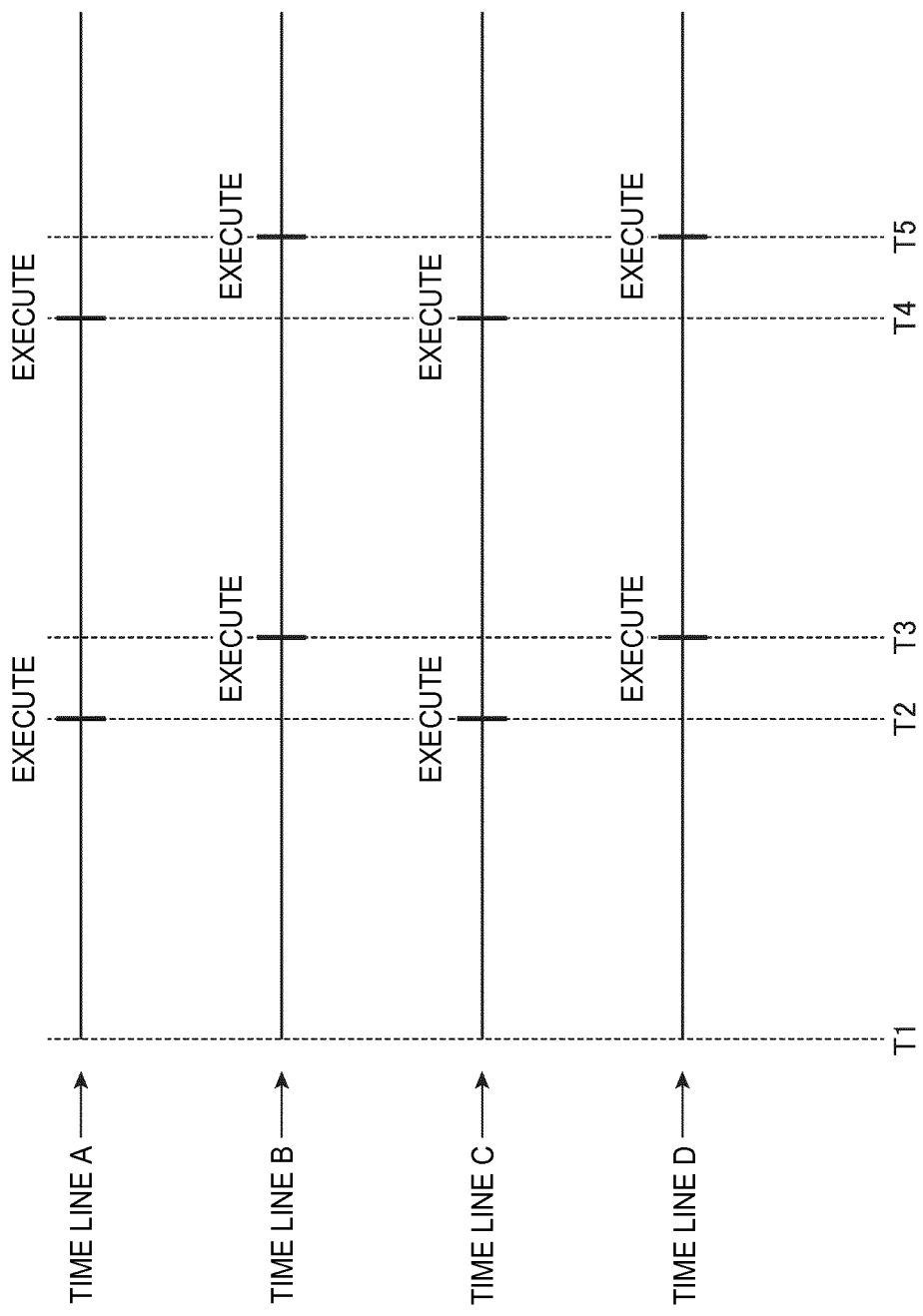
FIG. 5 is a timing chart for the operation of multiple printers.

FIG. 5 is a timing chart of the operation of each printer 100 in the store system 1. In FIG. 5, time line A shows the timing of the operation of printer 101. Time line B shows the timing of the operation of printer 102. Time line C shows the timing of the operation of printer 103. Time line D shows the timing of the operation of printer 104.

In the following description referring to FIG. 5, printer 101 to printer 104 store the following serial numbers. Printer 101 stores the serial number A001. Printer 102 stores the serial number A002. Printer 103 stores the serial number A003. Printer 104 stores the serial number A004.

While referring to FIG. 5, the start high-power cleaning operation period is set to 400 days, and the start high-power cleaning operation time is set to 22:00:00, in the maintenance settings file 34a of each printer 101 to printer 104. This time 22:00:00 is also a time outside the normal business hours of the store T.

Each printer 101 to printer 104 is turned on at time T1. As a result, printer 101 and printer 103, which are the printers having a serial number that ends with an odd number, set the start high-power cleaning operation period.

As described above, printer 101 stores the serial number A0001. As a result, the printer controller 30 of printer 101 determines that the last digit of the serial number assigned to the printer 101 is odd. The maintenance processor 301 of the printer 101 then sets the start high-power cleaning operation period to 395 days in the maintenance settings file 34a. More specifically, the maintenance processor 301 of the printer 101 changes the start high-power cleaning operation period from 400 days to 395 days.

Printer 102 stores the serial number A0002. As a result, the printer controller 30 of printer 102 determines that the last digit of the serial number assigned to the printer 102 is even (not odd).

Printer 103 stores the serial number A0003. As a result, the printer controller 30 of printer 103 determines that the last digit of the serial number assigned to the printer 102 is odd. The maintenance processor 301 of the printer 103 then writes 395 days as the start high-power cleaning operation period in the maintenance settings file 34a. More specifically, the maintenance processor 301 of the printer 103 changes the start high-power cleaning operation period from 400 days to 395 days.

Printer 104 stores the serial number A0004. As a result, the printer controller 30 of printer 104 determines that the last digit of the serial number assigned to the printer 104 is even (not odd).

Printer 101 to printer 104 start determining if the start high-power cleaning period has passed starting from the date of time T1.

In FIG. 5, time T2 comes at 22:00:00 on day 395 after the starting date, which is the date of time T1. At time T2, printer 101 and printer 103 execute the high-power cleaning operation. When the high-power cleaning operation is executed, printer 101 and printer 103 set the start high-power cleaning operation period in the maintenance settings file 34a to 400 days. More specifically, printer 101 and printer 103 reset the start high-power cleaning operation period from 395 days to 400 days. Printer 101 and printer 103 then start determining if the start high-power cleaning operation period of the set 400 days has passed since the starting date, which is the date time T2 occurred.

In the example in FIG. 5, time T3 occurs at 22:00:00 on day 400 after the date of time T1. At time T3, printer 102 and printer 104 execute the high-power cleaning operation. After executing the high-power cleaning operation, printer 102 and printer 104 again start determining if the 400 days of the set start high-power cleaning operation period have passed starting from the date of time T3.

By changing the start high-power cleaning operation period based on the serial number, printer 101 to printer 104 change the timing for executing the high-power cleaning operation.

In the example in FIG. 5, printer 101 and printer 103 of printer 101 to printer 104 executes the high-power cleaning operation at time T2. As a result, the high-power cleaning operation is not executed by every printer 101 to printer 104 at time T2, and the store system 1 being unable to print coupons and receipts for customers completing a transaction can be prevented.

In addition, printer 101 and printer 103 execute the high-power cleaning operation at 22:00:00 five days before printer 102 and printer 104 execute the high-power cleaning operation. As a result, even if the timing when printer 101 and printer 103 execute the high-power cleaning operation is outside the business hours of the store T, all of the printers 101 to 104 in the store T being out of ink when the store T next opens for business can be prevented. The need to replace the ink cartridge 500 in all of the printers 100 when the store next opens for business again can therefore be prevented. The store T also does not need to stock enough ink cartridges 500 to be able to replace the ink cartridge 500 in each printer 101 to printer 104 at one time. In other words, the store T does not need to stock a large number of ink cartridges 500 so that the ink cartridges 500 can all be replaced at one time.

In the example in FIG. 5, printer 102 and printer 104 of printer 101 to printer 104 execute the high-power cleaning operation at time T3. As a result, the high-power cleaning operation is not executed by every printer 101 to printer 104 at time T3, and the store system 1 being unable to print coupons and receipts for customers completing a transaction can be prevented.

In addition, printer 102 and printer 104 execute the high-power cleaning operation at 22:00:00 five days after printer 101 and printer 103 execute the high-power cleaning operation. As a result, even if the timing when printer 102 and printer 104 execute the high-power cleaning operation is outside the business hours of the store T, all of the printers 101 to 104 in the store T being out of ink when the store T next opens for business can be prevented. The need to replace the ink cartridge 500 in all of the printers 100 when the store next opens for business again can therefore be prevented. As described above, the store T also does not need to maintain a large stock of ink cartridges 500.

In FIG. 5, time T4 comes at 22:00:00 on day 400 after the starting date, which is the date of time T2. At time T4, printer 101 and printer 103 execute the high-power cleaning operation. The printer 101 and printer 103 execute the high-power cleaning operation at 22:00:00 on day 400 starting from the date of time T2 because the value (setting) of the start period setting item was set to 400 days at time T2.

In the example in FIG. 5, time T5 occurs at 22:00:00 on day 400 after the date of time T3. At time T5, printer 102 and printer 104 execute the high-power cleaning operation.

As described above, after time T2 and time T3, the timing when printer 101 and printer 103 execute the high-power cleaning operation, and the timing when the printer 102 and printer 104 execute the high-power cleaning operation, differ by five days. After time T4 and time T5, the timing when printer 101 and printer 103 execute the high-power cleaning operation, and the timing when the printer 102 and printer 104 execute the high-power cleaning operation, also differ by five days. This is because, at time T2, the start high-power cleaning operation period is changed from 395 days to 400 days, and the start high-power cleaning operation period of every printer 101 to printer 104 is set to 400 days.

More specifically, at time T2, after printer 101 and printer 103 execute the high-power cleaning operation, the start high-power cleaning operation period of printer 101 and printer 103 is changed to the same period as printer 102 and printer 104. Even more specifically, 400 days is the start high-power cleaning operation period set by default in the maintenance settings file 34a. As a result, after the printer 101 and printer 103 execute the high-power cleaning operation, the start high-power cleaning operation period of 395 days is reset to the default (previously set) start high-power cleaning operation period. As a result, because printer 101 and printer 103 execute the high-power cleaning operation five days before printer 102 and printer 104, and the same start high-power cleaning operation period is then set for all printers 100, there continues to be a five day difference in the timing when the high-power cleaning operation is executed by the different printers.

As described above, according to the first rule, the start high-power cleaning operation period is changed from 400 days to 395 days if the last digit of the serial number is an odd number. The invention is not so limited, however, and the start high-power cleaning operation period may be changed from 400 days to 395 days if the last digit of the serial number is an even number.

Second Rule

Operation of the printer 100 according to a second rule when setting the start high-power cleaning operation period in the maintenance settings file 34a is described next.

Figure 6:
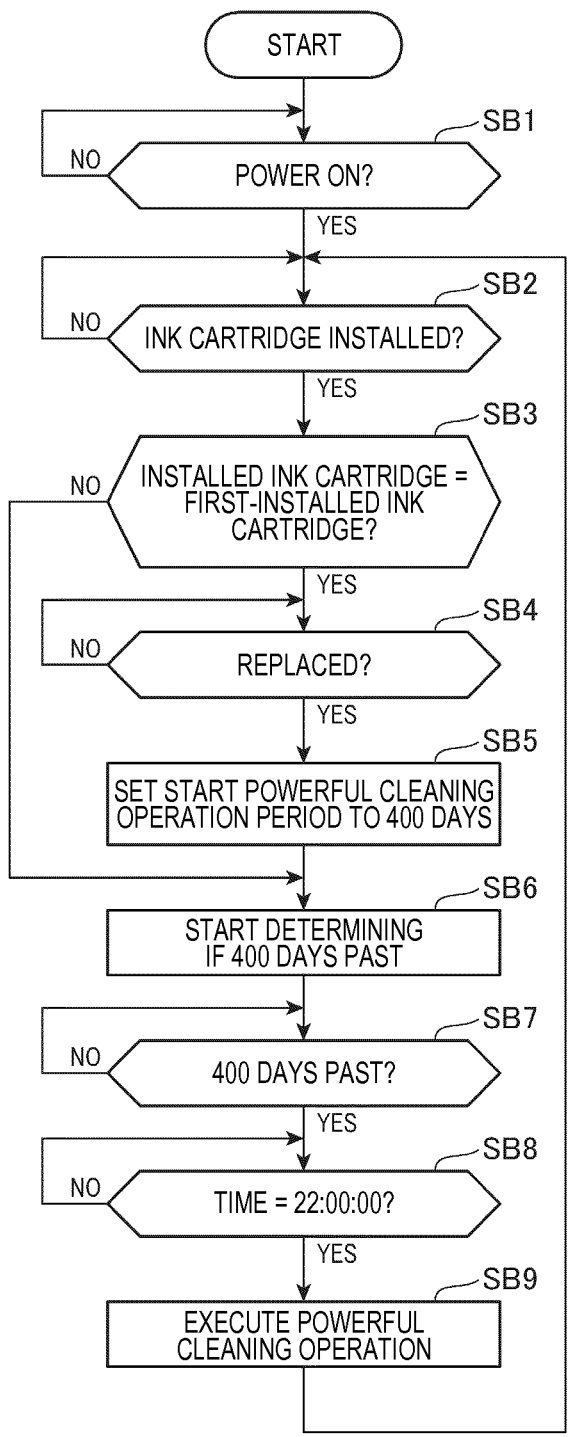
FIG. 6 is a flow chart describing an operation of the printer.

FIG. 6 is a flow chart of printer 100 operation.

When the process shown in the flow chart in FIG. 6 starts, a start high-power cleaning operation period setting is not already stored in the maintenance settings file 34a of the printer storage 34.

When a printer 100 is installed in the store T and the power turned on, the printer controller 30 of the printer 100 recognizes the power turned on (step SB1: YES). Next, the ink cartridge detector 302 of the printer 100 determines if an ink cartridge 500 is installed in the printer 100, (step SB2), and if an ink cartridge 500 is installed (step SB2: YES), goes to step SB3. In step SB3, the ink cartridge detector 302 references the log file 34b, and determines if the ink cartridge 500 installed in the printer 100 is the first ink cartridge 500 that was installed (step SB3).

As described above, the log file 34b records specific operations of the printer 100 and specific events that occurred with the printer 100. Therefore, when the ink cartridge 500 installed in the printer 100 is replaced, information indicating the ink cartridge 500 was replaced is recorded in the log file 34b. If information indicating such replacement is not recorded in the log file 34b, the ink cartridge detector 302 determines that the ink cartridge 500 installed in the printer 100 is the first ink cartridge 500 that was installed. Note that this decision method is for example only, and other methods may be used.

If the ink cartridge 500 installed in the printer 100 is not the first ink cartridge 500 that was installed (step SB3: NO), the maintenance processor 301 of the printer 100 goes to step SB6.

If the ink cartridge 500 installed in the printer 100 is determined to be the first ink cartridge 500 installed (step SB3: YES), the ink cartridge detector 302 determines if the ink cartridge 500 that was first installed was replaced (step SB4). Next, if replacement of the first ink cartridge 500 that was installed is detected (step SB4: YES), the maintenance processor 301 sets 400 days as the start high-power cleaning operation period in the maintenance settings file 34a (step SB5). More specifically, the maintenance processor 301 sets the value of the start period setting item in the maintenance settings file 34a to a value indicating 400 days. In other words, the maintenance processor 301 stores a start high-power cleaning operation period of 400 days in the printer storage 34. Note that the start high-power cleaning operation time may be set by the maintenance processor 301, but configurations in which the start high-power cleaning operation time is set by the user are also conceivable. When the start high-power cleaning operation time is set by the user, the time for starting the high-power cleaning operation can be set desirably according to how the printer 100 is used, such as the business hours of the business.

In the example in FIG. 6, 22:00:00 is set as the start high-power cleaning operation time in the maintenance settings file 34a.

Next, based on the current time information output from the RTC 38, the maintenance processor 301 starts determining if the start high-power cleaning operation period has passed (step SB6). More specifically, the maintenance processor 301 starts determining if 400 days have passed since after the starting date, which is the date the first-installed ink cartridge 500 was replaced.

If 400 days have passed since the starting date (step SB7: YES), more specifically, if the date indicated by the current-time date information is day 400 after the starting date, the maintenance processor 301 determines if the time indicated by the current-time time information is 22:00:00 (step SB8).

Next, if the time indicated by the current-time time information is 22:00:00 (step SB8: YES), the maintenance processor 301 executes the high-power cleaning operation (step SB9).

When the high-power cleaning operation is executed, the maintenance processor 301 returns to step SB3. The ink cartridge detector 302 then determines if the ink cartridge 500 installed to the printer 100 is the first ink cartridge 500 that was installed. If the ink cartridge 500 installed in the printer 100 is not the first ink cartridge 500 that was installed (step SB3: NO), the maintenance processor 301 determines if 400 days have passed starting from the date the high-power cleaning operation was last executed. If it is 22:00:00 on day 400, the maintenance processor 301 executes the high-power cleaning operation. In this way, after the ink cartridge 500 that was installed first is replaced, the maintenance processor 301 executes the high-power cleaning operation every 400 days after the starting date, which is the date the high-power cleaning operation was last executed.

Setting the start high-power cleaning operation period in the maintenance settings file 34a according to the second rule means that when the first-installed ink cartridge 500 is replaced, a start high-power cleaning operation period of 400 days is set in the maintenance settings file 34a. The effect of this is described further below.

The operation described in FIG. 6 is executed by each printer 101 to printer 104 in the store system 1.

What happens when each printer 101 to printer 104 in the store system 1 executes the above operation in FIG. 6 is described next.

Figure 7:
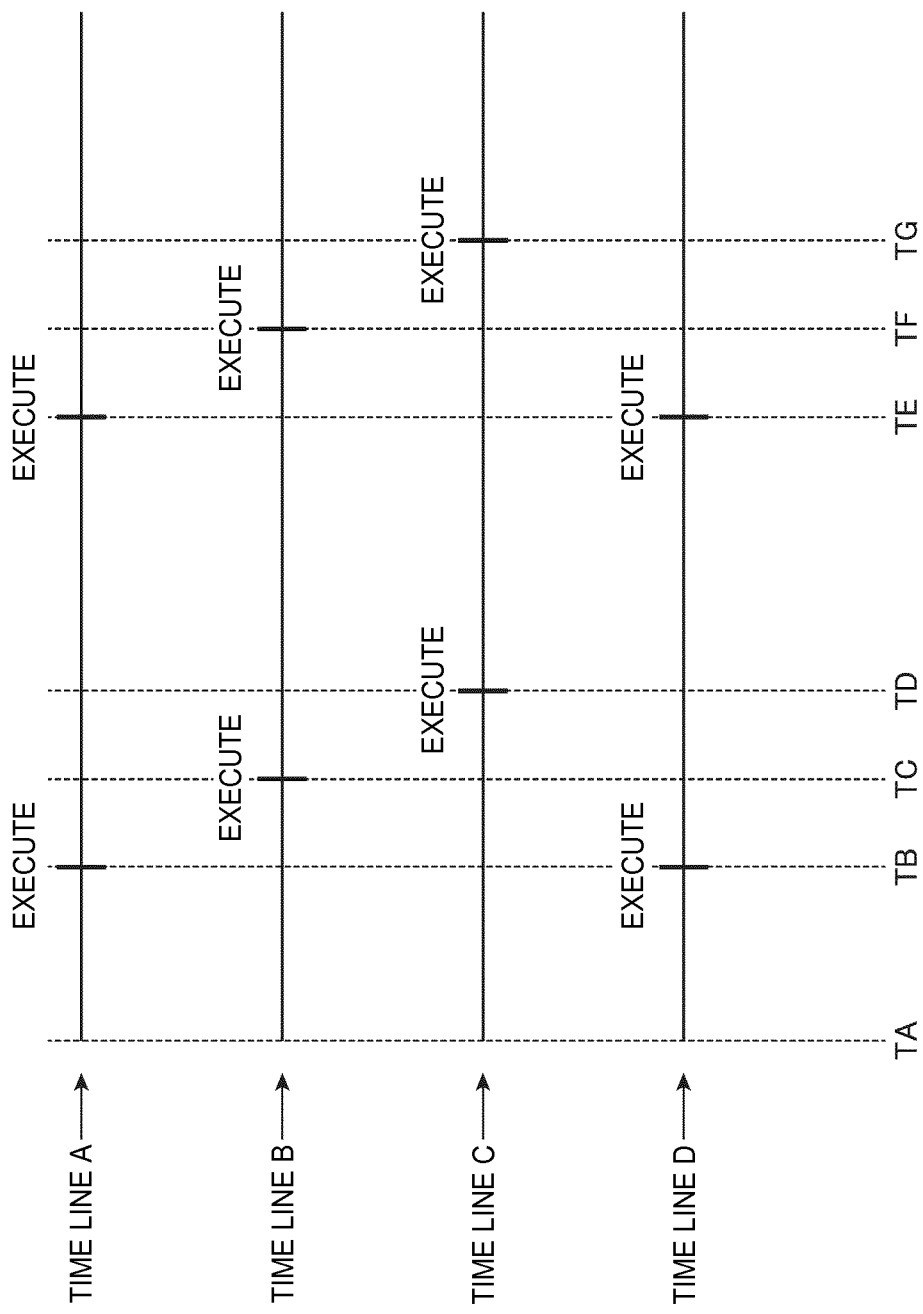
FIG. 7 is a timing chart for the operation of multiple printers.

FIG. 7 is a timing chart of the operation of each printer 100 in the store system 1. In FIG. 7, time line A shows the timing of the operation of printer 101. Time line B shows the timing of the operation of printer 102. Time line C shows the timing of the operation of printer 103. Time line D shows the timing of the operation of printer 104.

The operation described with reference to FIG. 7 is based on the frequency of use of printer 101 to printer 104 in the store T in FIG. 1 differing due to customers using some checkout counters more than others, and different checkout counters being manned by a checkout clerk more than others. The frequency of use is how frequently the printer 100 is used by a checkout clerk to print coupons or receipts. In the example in FIG. 1, the frequency of use of printer 101 and printer 104 is greater than the frequency of use of printer 102 and printer 103. The frequency of use of printer 102 is also greater than the frequency of use of printer 103 in FIG. 1. In the example in FIG. 1, the frequency of use of printer 103 is the lowest of all printers 100 in the store system 1.

At the start of the timing chart, the start high-power cleaning operation period is not set in the maintenance settings file 34a in each printer 101 to printer 104.

At time TA, printer 101 to printer 104 is turned on and an ink cartridge 500 is installed. The ink cartridge 500 installed at time TA is the first ink cartridge 500 installed in the printer 100. When the ink cartridge 500 is installed at time TA, the printer 101 to printer 104 executes a process of charging the nozzles with ink in preparation to print.

At time TB, the ink cartridge 500 installed in printer 101 and printer 104 is replaced. The ink cartridge 500 replaced at this time is the first ink cartridge 500 that was installed (at time TA). As described above, the frequency of use of printer 101 and printer 104 in the store T is greater than printer 102 and printer 103. As a result, as shown in FIG. 7, the ink cartridge 500 in printer 101 and printer 104 is replaced sooner than the ink cartridge 500 in printer 102 and printer 103 is replaced.

When the ink cartridge 500 installed in printer 101 and printer 104 is replaced at time TB, printer 101 and printer 104 execute the high-power cleaning operation. When printer 101 and printer 104 execute the high-power cleaning operation, they also set the start high-power cleaning operation period in the maintenance settings file 34a to 400 days. The date on which the high-power cleaning operation was executed, that is, the date of time TB, is then used as the starting date for counting 400 days.

The printer 101 and printer 104 also set a start high-power cleaning operation time of 22:00:00 in the maintenance settings file 34a at time TB.

At time TC, the ink cartridge 500 installed in printer 102 is replaced. In the example in FIG. 7, the date of time TC is five days after the date of time TB. In other words, the first ink cartridge 500 installed in printer 102 is replaced five days after the ink cartridge 500 installed in printer 101 and printer 104 was replaced. As described above, the frequency of use of printer 102 in the store T is greater than the frequency of use of printer 103. As a result, as shown in FIG. 7, the ink cartridge 500 in printer 102 is replaced sooner than the ink cartridge 500 in printer 103.

When the ink cartridge 500 installed in printer 102 is replaced at time TC, printer 102 executes the high-power cleaning operation. When printer 102 executes the high-power cleaning operation, it also sets the start high-power cleaning operation period in the maintenance settings file 34a to 400 days. The printer 102 also starts determining if 400 days have passed starting from the date on which the high-power cleaning operation was executed, that is, the date of time TC.

The printer 102 also sets a start high-power cleaning operation time of 22:00:00 in the maintenance settings file 34a at time TC.

At time TD, the ink cartridge 500 installed in printer 103 is replaced. In the example in FIG. 7, the date of time TD is five days after the date of time TC. In other words, the first ink cartridge 500 installed in printer 103 is replaced five days after the ink cartridge 500 of printer 102 was replaced.

As described above, the frequency of use of printer 103 in store T is lower than printer 101, printer 102, and printer 104. As a result, as shown in FIG. 7, the ink cartridge 500 of printer 103 is replaced last, that is, later than the ink cartridge 500 in printer 101, printer 102, and printer 104.

When the ink cartridge 500 installed in printer 103 is replaced at time TD, printer 103 executes the high-power cleaning operation. When printer 103 executes the high-power cleaning operation, it also sets the start high-power cleaning operation period in the maintenance settings file 34a to 400 days. The printer 103 also starts determining if 400 days have passed starting from the date on which the high-power cleaning operation was executed, that is, the date of time TD.

The printer 103 also sets a start high-power cleaning operation time of 22:00:00 in the maintenance settings file 34a at time TD.

In FIG. 7, time TE comes at 22:00:00 on day 400 from the starting date, which in this example is the date of time TB. At time TE, printer 101 and printer 104 execute the high-power cleaning operation. Printer 101 and printer 104 execute the high-power cleaning operation at different times than printer 102 and printer 103. This is because printer 101 and printer 104 executed the high-power cleaning operation at a sooner time than printer 102 and printer 103 (at time TB in FIG. 7), set a start high-power cleaning operation period of 400 days in the maintenance settings file 34a, and started counting whether or not 400 days have passed from the date of time TB. As a result, the high-power cleaning operation is not executed by every printer 101 to printer 104 at time TE, and the store system 1 being unable to print coupons and receipts for customers completing a transaction can be prevented.

The time of 22:00:00 is also a time outside the normal business hours of the store T. As a result, the timing when printer 101 and printer 104 execute the high-power cleaning operation is outside the normal business hours of the store T. However, the timing when printer 101 and printer 104 execute the high-power cleaning operation differs from the timing of printer 102 and printer 103. As a result, all of the printers 101 to 104 in the store T being out of ink when the store T next opens for business can be prevented. The need to replace the ink cartridge 500 in all of the printers 100 when the store next opens for business again can therefore be prevented. As described above, the store T therefore also does not need to maintain a large stock of ink cartridges 500.

In FIG. 7, time TF comes at 22:00:00 on day 400 from the starting date, which in this example is the date of time TC. At time TF, printer 102 executes the high-power cleaning operation. Printer 102 executes the high-power cleaning operation at a different time than printer 101, printer 103, and printer 104. This is because printer 102 executed the high-power cleaning operation at a later time than printer 101 and printer 104, and a sooner time than printer 103 (at time TC in FIG. 7), set a start high-power cleaning operation period of 400 days in the maintenance settings file 34a, and started counting whether or not 400 days have passed from the date of time TC. This has the same effect as when printer 101 and printer 104 execute the high-power cleaning operation at time TE.

In FIG. 7, time TG comes at 22:00:00 on day 400 from the starting date, which in this example is the date of time TD. At time TG, printer 103 executes the high-power cleaning operation. Printer 103 executes the high-power cleaning operation at a different time than printer 101, printer 102, and printer 104. This is because printer 103 executed the high-power cleaning operation at a later time than printer 101, printer 102, and printer 104 (at time TD in FIG. 7), set a start high-power cleaning operation period of 400 days in the maintenance settings file 34a, and started counting whether or not 400 days have passed from the date of time TD. This has the same effect as when printer 101, printer 102, and printer 104 execute the high-power cleaning operation at time TE and time TF.

After time TG, the timing when printer 101 and printer 104 execute the high-power cleaning operation, the timing when printer 102 executes the high-power cleaning operation, and the timing when printer 103 executes the high-power cleaning operation, continue to differ. This is because at time TB, time TC, and time TD, printer 101 to printer 104 all set the start high-power cleaning operation period to the same 400 days. As a result, the timing when printer 101 and printer 104 execute the high-power cleaning operation, the timing when printer 102 executes the high-power cleaning operation, and the timing when printer 103 executes the high-power cleaning operation, continue to differ.

As described above, the printer 100 prints by ejecting ink from nozzles. The printer 100 has a RTC 38 (real-time clock); printer storage 34 (storage unit) that stores a start high-power cleaning operation period (constant period; constant reference period) indicating a 400 day interval for executing a nozzle maintenance process; and a maintenance processor 301 that applies the maintenance to the nozzles. The maintenance processor 301 changes the start high-power cleaning operation period stored by the printer storage 34 according to a specific rule, and executes the nozzle maintenance operation at the changed start high-power cleaning operation period.

The process of changing the start high-power cleaning operation period stored in the printer storage 34 according to a specific rule, and executing the nozzle maintenance operation at the changed start high-power cleaning operation period, is applied by each printer 100. As a result, the timing when each printer 100 executes the nozzle maintenance operation can be made to differ from the timing other printers 100 execute the nozzle maintenance operation.

The maintenance processor 301 executes the nozzle maintenance operation at the changed start high-power cleaning operation period, and resets the changed start high-power cleaning operation period stored in the printer storage 34 to a start high-power cleaning operation period of 400 days.

Because the nozzle maintenance operation executes at the set start high-power cleaning operation period, and the start high-power cleaning operation period is reset to a start high-power cleaning operation period of 400 days, the timing when the nozzle maintenance operation is executed continues to differ from the timing of the other printers 100. In the example shown in FIG. 5, printer 101 and printer 103 execute the nozzle maintenance operation after 395 days, and then reset the start high-power cleaning operation period from 395 days to 400 days. The timing of the nozzle maintenance operation of the printer 101 and printer 103, and the timing of the nozzle maintenance operation of the printer 102 and printer 104, therefore continue to differ.

The maintenance processor 301 executes the high-power cleaning operation when the first-installed ink cartridge 500 is replaced, and then stores the start high-power cleaning operation period in the printer storage 34.

Because the high-power cleaning operation thus executes when the first-installed ink cartridge 500 is replaced, and the start high-power cleaning operation period is then stored in the printer storage 34, the timing when the nozzle maintenance operation is executed continues to differ from the timing of the other printers 100. In the example in FIG. 7, the timing when the first-installed ink cartridge 500 is replaced differs between printer 101 and printer 104, and printer 102 and printer 103. After the first ink cartridge 500 is replaced, the same start high-power cleaning operation period is set in each of printer 101 to printer 104. Printer 101 and printer 104, and printer 102 and printer 103, therefore continue to execute the nozzle maintenance operation at different times.

The maintenance processor 301 changes the start high-power cleaning operation period stored by the printer storage 34 based on a unique identifier assigned to each printer 100. The maintenance processor 301 changes the start high-power cleaning operation period based on the serial number of the printer 100.

As a result, the timing of the nozzle maintenance operation can be made to differ from the timing of the nozzle maintenance operation on other printers 100 based on the serial number. The serial number is an identifier assigned to the printer 100 during the manufacturing process. There is, therefore, no need for the user, for example, to assign a new identifier after the printer 100 is shipped in order to make the timing of the nozzle maintenance operation differ.

The nozzle maintenance operation includes a high-power cleaning operation for suctioning ink from the nozzle openings.

The high-power cleaning operation is a maintenance operation that consumes a large amount of ink. Because the timing of the nozzle maintenance operation differs from the timing of the nozzle maintenance operation on other printers 100, all of multiple printers 100 running out of ink at the same time can be prevented.

Embodiment 2

A store system 1A according to a second embodiment is described next.

Figure 8:
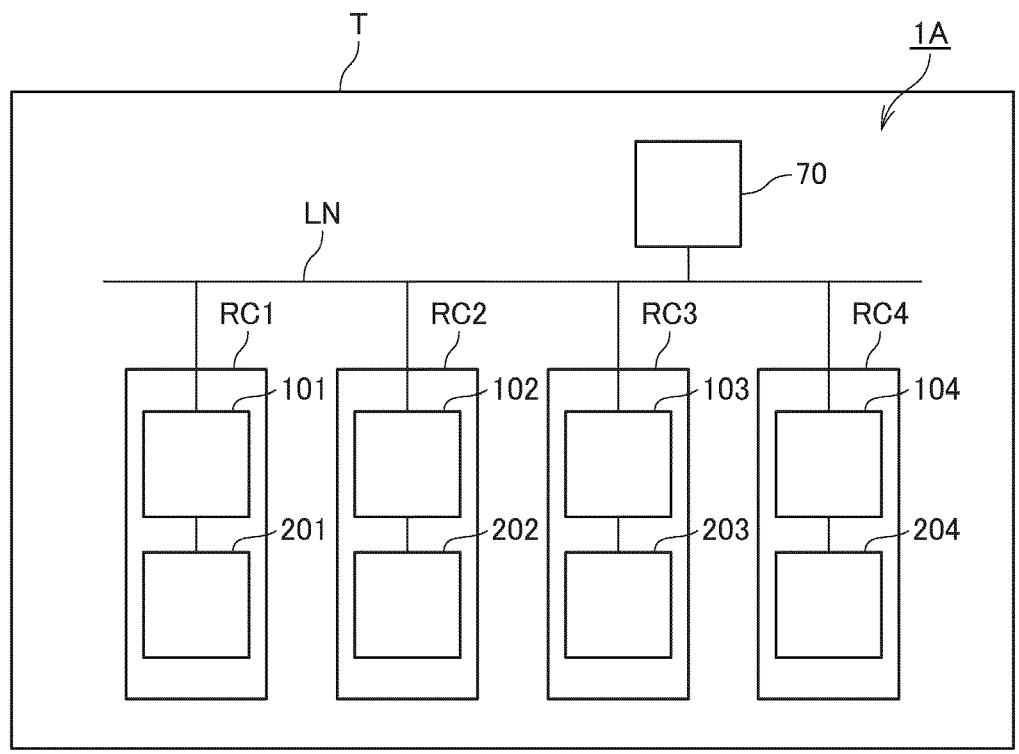
FIG. 8 is a block diagram illustrating a store system related to a second embodiment.

FIG. 8 is a block diagram of a store system 1A according to the second embodiment.

The store system 1A of this second embodiment differs from the store system 1 of the first embodiment in having a control device 70 that controls printer 101 to printer 104. As will be apparent by comparing FIG. 1 and FIG. 8, the control device 70, and printer 101 to printer 104, are connected to a local area network LN.

Note that like parts in this embodiment and the store system 1 of the first embodiment described above are identified by like reference numerals, and further description thereof is omitted or simplified.

Figure 9:
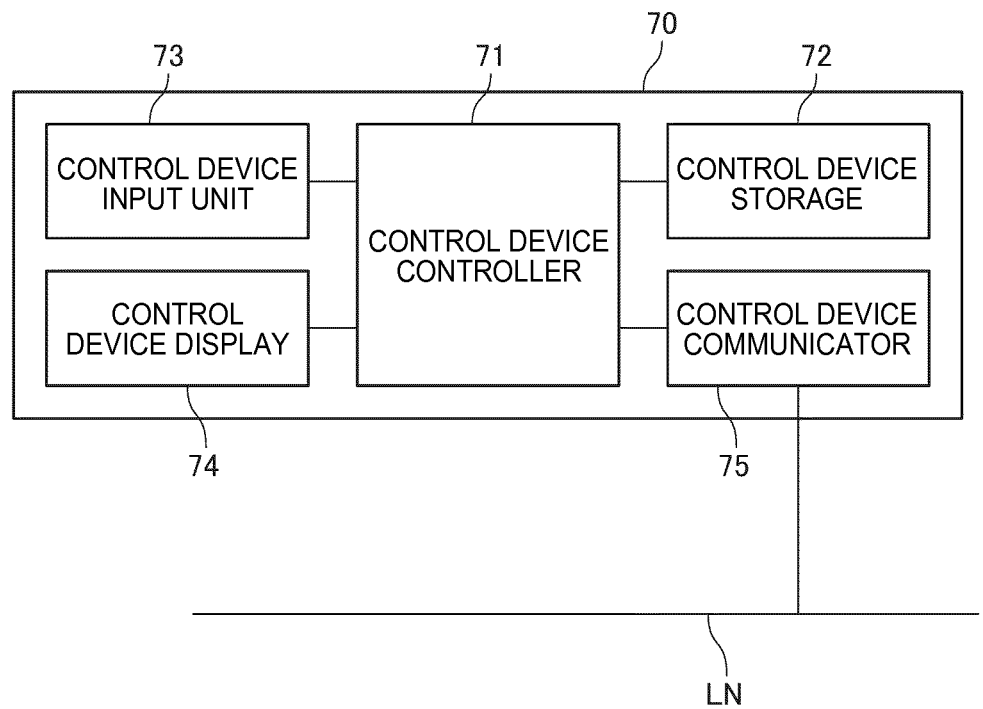
FIG. 9 is a block diagram illustrating the functional configuration of a control device.

FIG. 9 is a block diagram of the functional configuration of the control device 70.

As shown in FIG. 9, the control device 70 includes a control device controller 71 (controller), control device storage 72, control device input unit 73, control device display 74, and control device communicator 75.

The control device controller 71 includes a CPU, ROM, RAM, and other peripheral circuits not shown, and controls the control device 70 by the cooperation of hardware and software, such as a CPU reading and running a program.

The control device storage 72 is a nonvolatile memory device such as an EEPROM device or hard disk drive, and rewritably stores data.

The control device input unit 73 is connected to input means such as input devices or operating switches, detects operation of the input means, and outputs to the control device controller 71.

The control device display 74 has a display panel or other display device, and displays information on the display device as controlled by the control device controller 71.

The control device communicator 75 connects to the local area network LN, and communicates with the printers 100 according to a specific communication protocol as controlled by the control device controller 71.

Below, the control device 70 can communicate with each printer 101 to printer 104. More specifically, the control device 70 can identify and communicate individually with printer 101 to printer 104 connected to the local area network LN. The control device storage 72 of the control device 70 therefore stores identification information such as an IP address enabling identifying and communicating with printer 101 to printer 104 connected to the local area network LN. A start high-power cleaning operation period of 400 days is also previously set in the maintenance settings file 34a of printer 101 to printer 104.

The operation of the control device 70 and printers 100 in the store system 1A according to the second embodiment.

Figure 10:
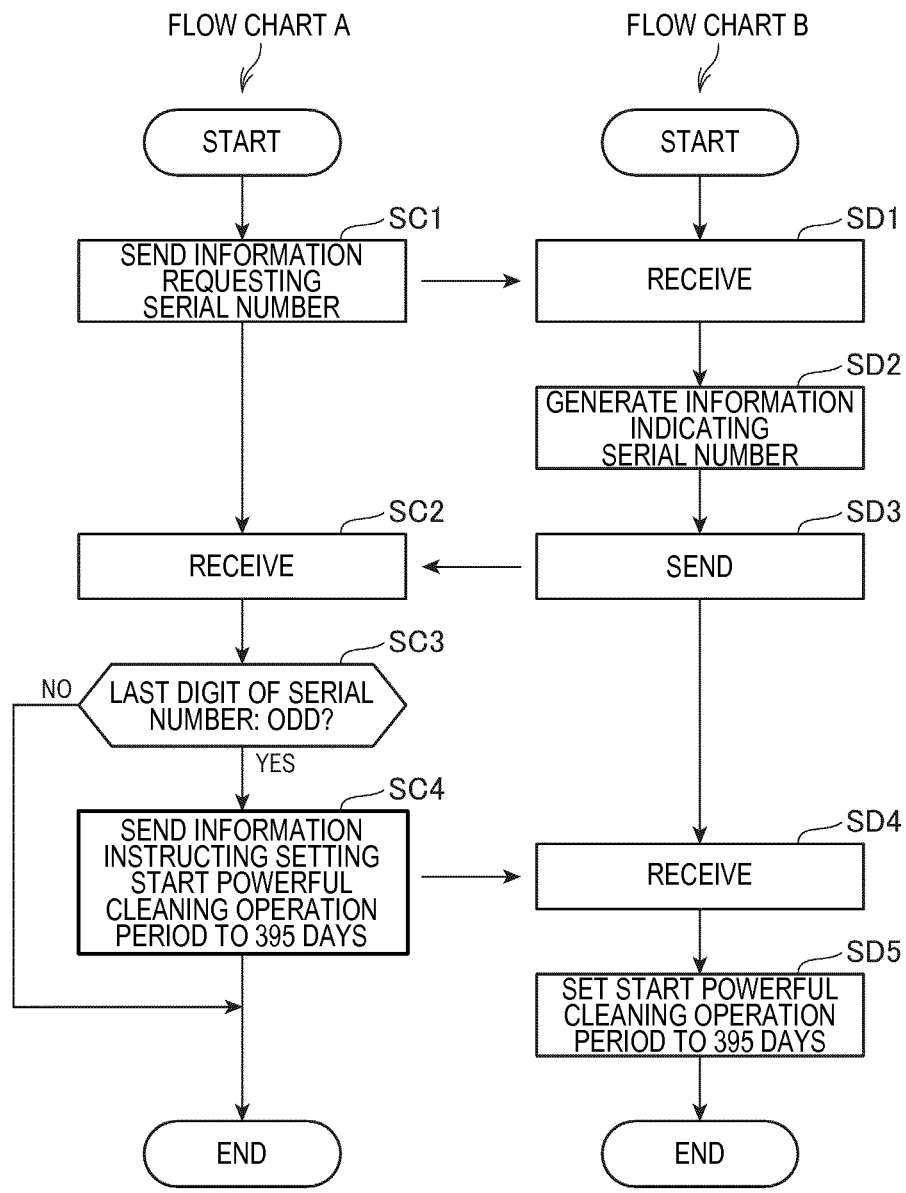
FIG. 10 is a flow chart describing an operation of the control device and printer.

FIG. 10 is a flow chart of the operation of the control device 70 and printers 100 in the store system 1A. Flow chart A in FIG. 10 shows the operation of the control device 70, and flow chart B shows the operation of a printer 100.

When flow chart A and flow chart B in FIG. 10 start, communication between the control device 70 and printer 100 is already enabled.

As shown in flow chart A in FIG. 10, the control device controller 71 of the control device 70 sends to the printer 100 information requesting the serial number of the printer 100 (step SC1).

As shown in flow chart B in FIG. 10, the printer controller 30 of the printer 100 receives the information requesting the serial number (step SD1). Next, the printer controller 30 generates information indicating the serial number (step SD2), and sends the generated information to the control device 70 (step SD3).

For example, if the control device 70 sends a serial number request to printer 101, and the printer storage 34 of printer 101 stores the serial number A0001, the printer controller 30 of printer 101 sends information indicating A0001 to the control device 70.

Likewise, if the control device 70 sends a serial number request to printer 102, and the printer storage 34 of printer 102 stores the serial number A0002, the printer controller 30 of printer 102 sends information indicating A0002 to the control device 70.

Likewise, if the control device 70 sends a serial number request to printer 103, and the printer storage 34 of printer 103 stores the serial number A0003, the printer controller 30 of printer 103 sends information indicating A0003 to the control device 70.

Likewise, if the control device 70 sends a serial number request to printer 104, and the printer storage 34 of printer 104 stores the serial number A0004, the printer controller 30 of printer 104 sends information indicating A0004 to the control device 70.

As shown in the flow chart in FIG. 10, the control device controller 71 receives the serial number information from the printer 100 (step SC2).

Next, the control device controller 71 determines if the last digit in the serial number stored in the received information is an odd number (step SC3). In other words, control device controller 71 determines wither the serial number in the received information is an odd or even number.

For example, when information indicating A0001 is received from printer 101, the control device controller 71 determines the last digit in the serial number, A0001, is odd. When information indicating A0002 is received from printer 102, the control device controller 71 determines the last digit in the serial number, A0002, is not odd, that is, is even. When information indicating A0003 is received from printer 103, the control device controller 71 determines the last digit in the serial number, A0003, is odd. When information indicating A0004 is received from printer 104, the control device controller 71 determines the last digit in the serial number, A0004, is not odd, that is, is even.

When the control device controller 71 determines the last digit of the serial number is odd (step SC3: YES), the control device controller 71 sends information instructing setting a start high-power cleaning operation period of 395 days in the maintenance settings file 34a (step SC4). For example, when the control device controller 71 determines the last digit of the serial number of printer 101 is odd, it sends this information to printer 101. When the control device controller 71 determines the last digit of the serial number of printer 103 is odd, it sends this information to printer 103.

When the control device controller 71 determines the last digit of the serial number is not odd (step SC3: NO), the control device controller 71 does not send information instructing setting a start high-power cleaning operation period of 395 days in the maintenance settings file 34a. For example, when the control device controller 71 determines the last digit of the serial number of printer 102 is not odd, it does not send this information to printer 102. When the control device controller 71 determines the last digit of the serial number of printer 104 is not odd, it does not send this information to printer 104.

As shown in flow chart B in FIG. 10, the printer controller 30 receives the information instructing setting a start high-power cleaning operation period of 395 days in the maintenance settings file 34a (step SD4).

Next, based on the information received in step SD4, the maintenance processor 301 of the printer 100 sets the start high-power cleaning operation period in the maintenance settings file 34a (step SD5). For example, the maintenance processor 301 of printer 101 sets a start high-power cleaning operation period of 395 days in the maintenance settings file 34a. More specifically, the maintenance processor 301 of the printer 101 changes the start high-power cleaning operation period from 400 days to 395 days. The maintenance processor 301 of printer 103 sets a start high-power cleaning operation period of 395 days in the maintenance settings file 34a. More specifically, the maintenance processor 301 of the printer 103 changes the start high-power cleaning operation period from 400 days to 395 days.

In this way, the control device controller 71 sets the start high-power cleaning operation period in at least some printers 100 of the multiple printers 100 so that all of the multiple printers 100 do not execute the high-power cleaning operation at the same time. For example, the control device 70 sends information causing printer 101 and printer 103 to set a different start high-power cleaning operation period than the previously set default start high-power cleaning operation period of 400 days so that the start high-power cleaning operation period of printer 101 and printer 103 (the timing when printer 101 and printer 103 execute the high-power cleaning operation), and the start high-power cleaning operation period of printer 102 and printer 104 (the timing when printer 102 and printer 104 execute the high-power cleaning operation), differ. Some printers 100 can therefore be made to execute the high-power cleaning operation at different times than other printers 100. This has the same effect as the first embodiment.

When a printer 100 for which the start high-power cleaning operation period is set to 395 days executes the high-power cleaning operation after 395 days pass, the control device controller 71 of the control device 70 may execute a process of resetting the start high-power cleaning operation period from 395 days to 400 days. In this case, the control device controller 71 sends to the printer 100 for which the start high-power cleaning operation period is set to 395 days information instructing the printer 100 to set the start high-power cleaning operation period setting in the maintenance settings file 34a to 400 days. As a result, the timing of the nozzle maintenance operation by printer 101 and printer 103, and the timing of the nozzle maintenance operation by printer 102 and printer 104, continue to differ.

As described above, the second embodiment changes the start high-power cleaning operation period from 400 days to 395 days if the last digit of the serial number is an odd number. The invention is not so limited, however, and the start high-power cleaning operation period may be changed from 400 days to 395 days if the last digit of the serial number is an even number.

Variations

Another embodiment is described below.

Figure 11:
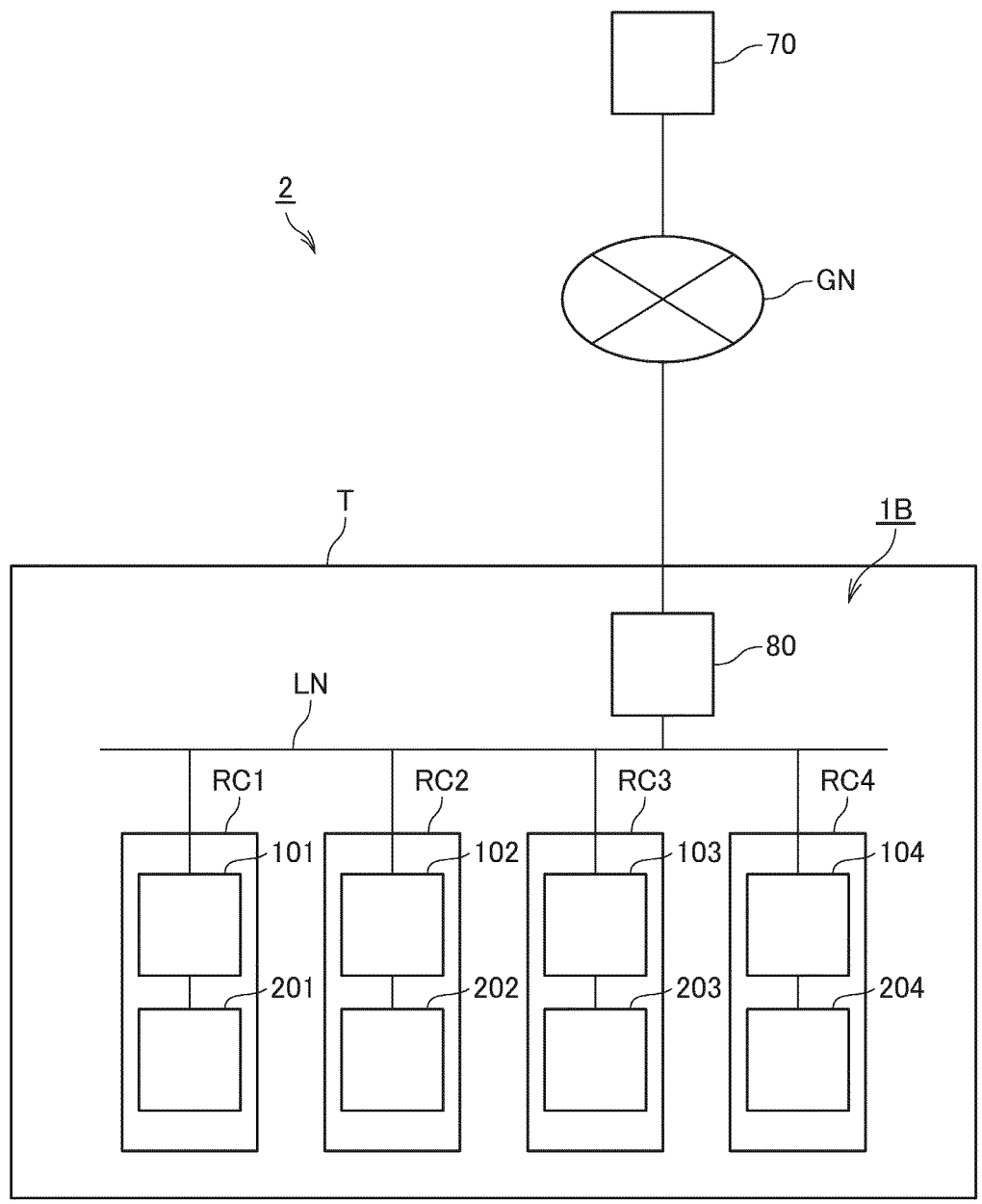
FIG. 11 shows an example of the configuration of a maintenance system.

FIG. 11 shows an example of a maintenance system 2.

As shown in FIG. 11, the maintenance system 2 includes multiple printers 101 to 104, and a control device 70.

As will be apparent from comparing the store system 1B in FIG. 11 and the store system 1A according to the second embodiment, store system 1B has a communicator 80 and does not include the control device 70.

The communicator 80 is an interface device for connecting the local area network LN to a global network GN. The communicator 80 functions as a modem (or ONU (Optical Network Unit)), a router, NAT (Network Address Translator), and DHCP (Dynamic Host Configuration Protocol) server. When a device connected to the local area network LN communicates with a device connected to the global network GN, the communicator 80 relays the data communicated between the devices. Note that in FIG. 11 the communicator 80 is represented by a single block, but the communicator 80 may comprise multiple devices with specific functions.

As shown in FIG. 11, the maintenance system 2 has a control device 70 connected to the global network GN, and the control device 70 and printer 101 to printer 104 communicate through the communicator 80.

The maintenance system 2 shown in FIG. 11 achieves the same effect as the store system 1A according to the second embodiment. More specifically, the same effect as the store system 1A according to the second embodiment even if the control device 70 is connected to the global network GN.

Embodiments are described above, but the invention is not limited thereto and can be modified and adapted in many ways without departing from the scope of the accompanying claims.

For example, the embodiments described above describe setting the start high-power cleaning operation period to 395 days when the last digit of the serial number is an odd number, but the invention is not limited to using the least significant digit of the serial number. For example, the start high-power cleaning operation period may be set to 395 days when the last digit of the serial number is a prime number.

The default start high-power cleaning operation period is 400 days in the foregoing embodiments, but the invention is not limited to 400 days. The start high-power cleaning operation period is also set to 395 days in the maintenance settings file 34a when the serial number is an odd number, but the invention is not limited to 395 days.

The process units shown in FIG. 4, FIG. 6, and FIG. 10 are divided according to the primary process content to facilitate understanding the processes of the printer 100 and control device 70, and the invention is not limited to a specific naming or division of process units. The processes of the printer 100 and control device 70 may also be further divided into more process units according to the process content. A single process unit may also be configured to include more processes.

The function units shown in FIG. 2 and FIG. 9 illustrate desirable functional configurations, but the specific configuration of the invention is not limited thereto. More specifically, hardware components corresponding individually to each function unit are not necessarily required, and configurations in which a single processor embodies the functions of multiple function units by executing a specific program or programs are possible. Some functions embodied by software in the foregoing embodiments may instead be embodied by hardware, and some functions embodied by hardware in the foregoing embodiments may instead be embodied by software. The specific details of the configuration of the printer 100, host computer 200, and control device 70 may also be varied in many ways without departing from the scope of the accompanying claims.

Embodiments being thus described, it is evident that they may be varied in many ways. Such variations are not to be regarded as a departure from the spirit and scope of the invention, and all such modifications as would be evident to one skilled in the art are intended to be included within the scope of the following claims.

What is claimed is:

1. A printing device configured to be used simultaneously with other printing devices, the printing device comprising:
   a print head configured to print by ejecting ink from nozzles;
   a timekeeper configured to keep time;
   a storage configured to store a reference period for executing a nozzle maintenance operation, the reference period being initially set at an initial reference period; and
   a maintenance processor configured to:
      execute a nozzle maintenance operation each time the reference period passes based on the time kept by the timekeeper,
      change, without acquiring information related to maintenance from the other printing devices, the reference period stored in the storage from the initial reference period to a changed reference period such that a timing of the nozzle maintenance operation differs from a timing of the nozzle maintenance operation of at least one of the other printing devices, and
      execute the nozzle maintenance operation after the changed reference period passes.

2. A printing device configured to be used simultaneously with other printing devices, the printing device comprising:
   a print head configured to print by ejecting ink from nozzles;
   a timekeeper configured to keep time;
   a storage configured to store a reference period for executing a nozzle maintenance operation, the reference period being initially set at an initial reference period; and
   a maintenance processor configured to:
      execute a nozzle maintenance operation each time the reference period passes based on the time kept by the timekeeper,
      change the reference period stored in the storage from the initial reference period to a changed reference period such that a timing of the nozzle maintenance operation differs from a timing of the nozzle maintenance operation of at least one of the other printing devices,
      execute the nozzle maintenance operation after the changed reference period passes, and
      return, after the maintenance processor executes the nozzle maintenance operation after the changed reference period passes, the changed reference period stored by the storage to the initial reference period.

3. The printing device described in claim 1, wherein:
   the maintenance processor is configured to change the reference period from the initial reference period to the changed reference period based on a unique identifier assigned to the printing device.

4. The printing device described in claim 3, wherein the identifier is a serial number.

5. The printing device described in claim 1, wherein the nozzle maintenance includes a cleaning operation of suctioning ink from the nozzle openings.

6. A method of controlling a printing device that is used simultaneously with other printing devices and includes: a print head that prints by ejecting ink from nozzles, a timekeeper that keeps time, storage that stores a reference period for executing a nozzle maintenance operation, the reference period being initially set at an initial reference period, and a maintenance processor that, based on the time kept by the timekeeper, executes a nozzle maintenance operation each time the reference period passes, the method comprising:
   changing, without acquiring information related to maintenance from the other printing devices, the reference period stored in the storage from the initial reference period to a changed reference period such that a timing of the nozzle maintenance operation differs from a timing of the nozzle maintenance operation of at least one of the other printing devices; and
   executing the nozzle maintenance operation after the changed reference period passes.

* * * * *